United States Patent
Fischer et al.

[11] Patent Number: 5,959,381
[45] Date of Patent: Sep. 28, 1999

[54] DUAL RATE SPRING FOR BEARING RETENTION

[75] Inventors: Henry E. Fischer; Arthur C. Keck, both of Fort Wayne, Ind.

[73] Assignee: General Electric Company, Schenectady, N.Y.

[21] Appl. No.: 09/034,193

[22] Filed: Mar. 3, 1998

[51] Int. Cl.[6] .................................................. H02K 5/16
[52] U.S. Cl. .......................... 310/90; 310/90; 384/204; 384/206
[58] Field of Search ............................. 310/90; 384/206, 384/204

[56] References Cited

U.S. PATENT DOCUMENTS

| | | | |
|---|---|---|---|
| 3,624,434 | 11/1971 | Dafler | 310/239 |
| 3,789,251 | 1/1974 | King | 310/238 |
| 4,711,590 | 12/1987 | Lakin | 384/206 |
| 4,800,309 | 1/1989 | Lakin | 310/90 |
| 4,924,127 | 5/1990 | Boireau et al. | 310/90 |
| 5,677,584 | 10/1997 | Keck | 310/90 |

FOREIGN PATENT DOCUMENTS

9626B/33  8/1979  Germany .
4-248346  3/1992  Japan .

Primary Examiner—Nestor Ramirez
Assistant Examiner—Thanh Lam
Attorney, Agent, or Firm—Welsh & Katz, Ltd.; Wayne O. Traynham; Carl B. Horton

[57] ABSTRACT

A bearing retainer for use in a dynamoelectric machine having a rotating shaft and a bearing having a passage therethrough for rotatably receiving the shaft and being positioned within a bearing seat, includes inner and outer concentric support elements. The inner support element defines a thrust portion. Each of the inner and outer support elements defines a plane. A plurality of connectors extend between and connect the inner and outer concentric support elements. The connectors are configured so as to support the inner support element in concentric relation to the outer support element and to support the inner and outer support elements such that the planes defined thereby are non-coplanar with one another. A plurality of bearing load support projections extend inwardly from the outer concentric support element. The support projections extend inwardly a distance so as to define a gap between an end of each projection and the inner support element.

11 Claims, 2 Drawing Sheets

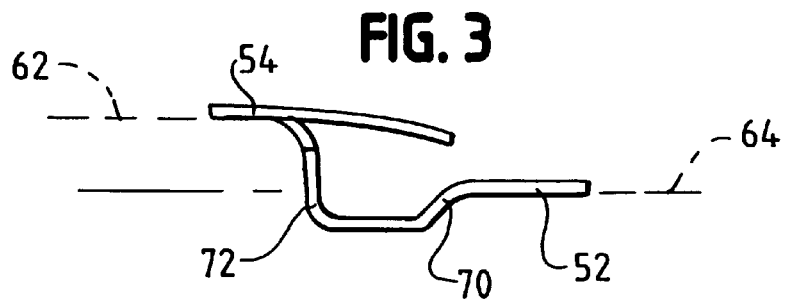
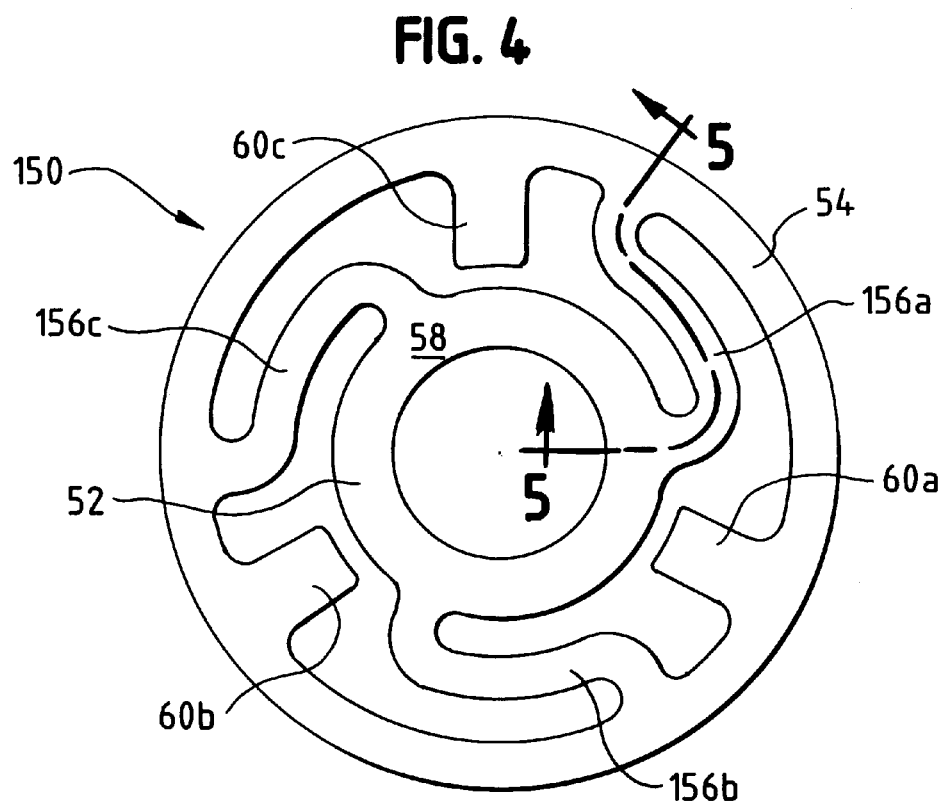
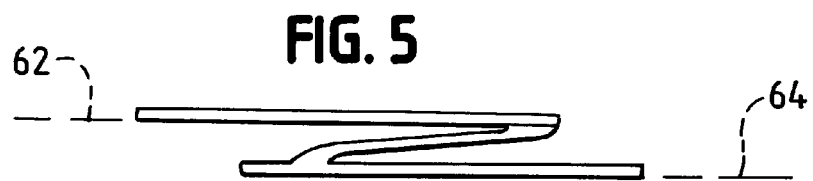

DUAL RATE SPRING FOR BEARING RETENTION

FIELD OF THE INVENTION

This invention pertains to a dual rate spring for bearing assembly retention for use in a dynamoelectric machine. More particularly, the invention relates to a dual rate spring that retains a spherical bearing in position and provides a thrust surface for the bearing for use in a dynamoelectric machine.

BACKGROUND OF THE INVENTION

Dynamoelectric machines, such as motors, typically include a rotatable rotor and a shaft extending outwardly from at least one end of the rotor. The shaft is mounted to the rotor so that the rotation axis of the shaft is coaxial with the axis of rotation of the rotor. The shaft extends from the rotor and through an opening formed in the motor end plate. Typically, a bearing is mounted in the end plate and supports the shaft.

Alignment between the shaft and the bearing is important in that misalignment could disturb operation of the motor, including rendering the motor inoperable. For example, during normal operation, a hydrodynamic lubricating film is formed between the bearing and shaft by oil supplied from an oil wick. If side forces or other forces cause misalignment between the bearing and the shaft, the film could be disrupted. As a result, metal-to-metal contact can be made between the bearing and the shaft. Such metal-to-metal contact, of course, is highly undesirable.

Various types of bearing systems have been developed to control the amount of radial movement of the rotating rotor portion, and to provide a lubricated surface about which the shaft rotates. One such bearing assembly is disclosed in U.S. Pat. No. 5,677,584 to Keck, which patent is commonly assigned herewith and is incorporated herein by reference.

While a bearing assembly such as that disclosed in the above-referenced Keck patent works well for its intended fuiction, there are often times when the rotor requires axial alignment and support in order to prevent "thrust" from axially dislocating the rotor relative to the motor stator. Such axial pulsations of the rotor can result in, among other things, objectionable motor noises.

A number of thrust compensating arrangements have been developed to address this axial thrust problem. However, none of these thrust compensating arrangements address the radial bearing alignment function. In one arrangement that is configured to suppress only thrust fluctuations, a "three-spoke" spring element is configured with unidirectional arcuate spring arms that extend from each of the ends of the spokes. Although such an arrangement suppresses fluctuation of thrust loads, it does not in any way function to prevent radial movement of the rotating element. Viewed another way, such a spring does not enhance axial alignment and retention of the bearing in the bearing seat.

Another known configuration includes a securing ring having a relatively large opening in the center thereof to accommodate the motor shaft. The ring includes one or more surfaces to support the rotating motor element. The inner portion of the ring is interrupted by a plurality of slots and securing fingers to provide axial support. Again, while "thrust-suppression" is provided, there still exists the potential for the rotor to shift radially and, thus damage the rotor and stator.

Accordingly, there continues to be a need for a one-piece bearing retention element that includes an integral thrust surface for use with dynamoelectric machines. Such a bearing retention member provides a dual rate spring for providing different support forces for maintaining the motor bearing in its seat, while simultaneously providing "thrust" compensating or accommodating forces.

SUMMARY OF THE INVENTION

A bearing retainer for use in a dynamoelectric machine, such as a motor, having a rotating shaft and a bearing having a passage therethrough for rotatably receiving the shaft and positioned within a bearing seat, includes inner and outer concentric support elements. The inner support element defines a thrust portion and the outer support element defines a bearing support portion. Each of the inner and outer support elements defines a plane.

The retainer includes a plurality of connectors extending between and connecting the inner and outer concentric support elements. The connectors are configured so as to support the inner support element in concentric relation to the outer support element. The connectors further support the inner and outer support elements such that the planes defined thereby are non-coplanar with one another.

The retainer includes a plurality of bearing load support projections, which are springs that extend inwardly from the outer concentric support element. The load support projections extend inwardly a distance so as to define a gap between an end of each projection and the inner support element.

DESCRIPTION OF THE DRAWINGS

FIG. 3 is a cross-sectional view of the retainer spring of FIG. 2, taken along line 3—3 of FIG. 2;

FIG. 4 is a top plan view of an alternate embodiment of the dual rate retainer spring; and FIG. 5 is a partial cross-sectional view taken along line 5—5 of FIG. 4 of the alternate embodiment of the dual rate spring.

DETAILED DESCRIPTION OF THE INVENTION

Figure 1:
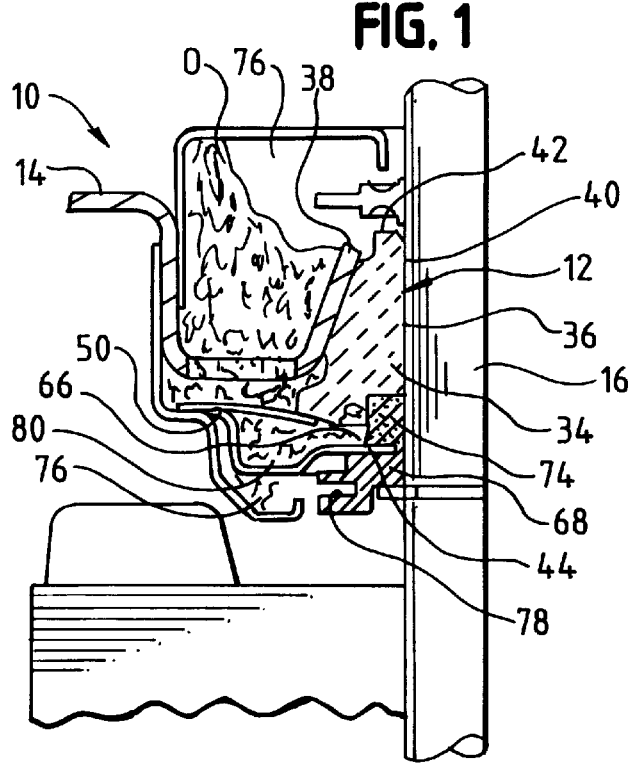
FIG. 1 is a partial cross sectional view of an exemplary motor illustrated with one embodiment of a dual rate retainer spring embodying the principles of the present invention, positioned in the motor.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring now to the figures and in particular to FIG. 1, there is shown an exemplary dynamoelectric machine 10 in partial cross sectional view. For purposes of the present invention, the exemplary machine 10 will be referred to as a motor. However, those skilled in the art will recognize that the present dual rate spring can be used in other rotating, e.g., dynamoelectric machines, and such other uses are within the scope of the present invention.

A bearing assembly 12 is mounted adjacent to an end plate 14 of the motor 10 for supporting and aligning one end of a shaft 16 for rotation relative to a motor housing of which end plate 14 is a portion. A typical motor as shown in the aforenoted U.S. Pat. No. 5,677,584 to Keck, includes a stator assembly having annular windings defining a central bore. A cylindrically shaped rotor is located in the stator bore for rotation therein. The shaft 16 extends from an end of the rotor, through the bearing assembly 12. At an opposite end of the rotor, another alignable bearing assembly is housed in a cover adjacent to an end plate 14. A cylindrical outer shell extends between the end plates 14, and a plurality of bolts extend through the end plates 14 to engage nuts for enclosing and securing the end plates 14 to the outer shell.

The bearing assembly 12 includes a bearing member 34 having a passageway 36 therethrough for receiving the shaft 16. The bearing member 34 is seated in bearing engagement with a frusto-conical bearing seat 38 integrally formed with the end plate 14 and defining a central opening 40. The bearing member 34 has an annular shape and is preferably constructed from sintered metal. The passageway 36 extends through the bearing member 34 between first and second oppositely facing end surfaces 42, 44, respectively. The shaft 16 rotates relative to the bearing 34 on a thin hydrodynamic film of lubricating oil formed between the shaft 16 and the bearing member 34 walls.

A self-centering dual spring bearing retainer 50 urges the bearing 34 into alignment with the bearing seat 38. The retainer 50 includes concentric, inner and outer circular support elements 52, 54, respectively, connected by a plurality of preferably circumferentially equally spaced, biased bridges 56a–c. However, the spacing need not necessarily be equal. The inner support element 52 defines a thrust portion having a surface 58, and the outer support element 54 defines a support portion. The retainer 50 further includes a plurality of equally circumferentially spaced bearing load projections or stubs 60a–c extending inwardly from the support element 54 toward the thrust (i.e., inner) element 52. Both the connectors or bridges 56a–c and the bearing load projections 60a–c are spring elements.

Figure 2:
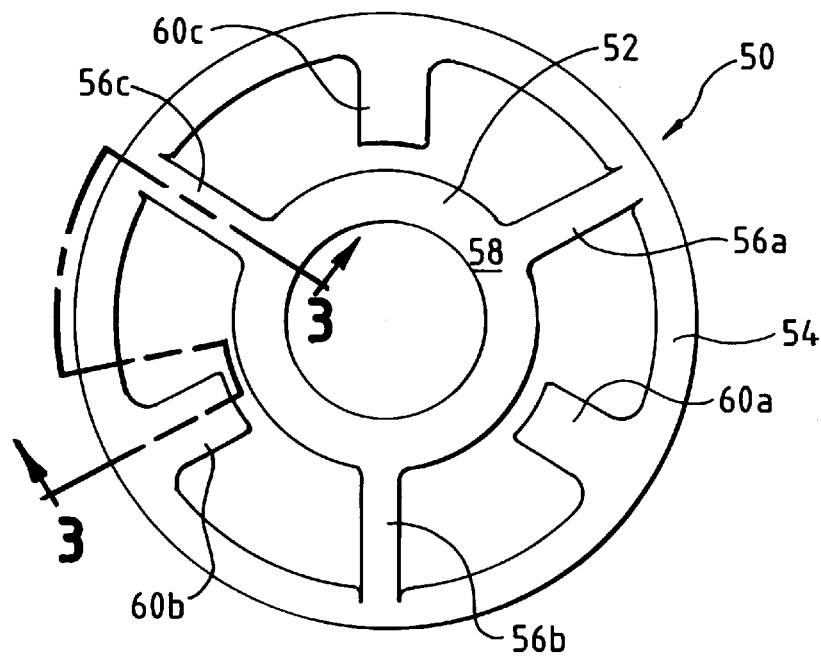
FIG. 2 is top plan view of the retainer spring of FIG. 1.

In an embodiment of the retainer 50 as illustrated in FIGS. 2–3, the bridge portions 56a–c connecting the support 54 and thrust 52 portions extend in a radially straight path therebetween. The retainer 50 includes three bridges or connectors 56a–c circumferentially preferably spaced from one another by about 120° and three bearing load projections 60a–c preferably spaced from one another by about 120° and positioned between each of the connectors 56a–c. The connectors 56a–c and their respective adjacent bearing load projections 60a–c are preferably spaced from one another by about 60°.

The thrust portion 52 accommodates any longitudinal thrust loads normally placed on the bearing assembly 12. The bearing load projections 60a–c define biased support elements for longitudinally supporting the bearing 34 relative to the motor 10 and for retaining the bearing 34 in the bearing seat 38.

As can be seen from the figures, and in particular FIG. 3, the support element 54 and the thrust portion 52 each provide, respectively, a support plane indicated at 62 for the bearing 34, and a thrust surface plane indicated at 64 for the bearing 34. The planes 62, 64 are essentially parallel, but are not coplanar. That is, the outer support element 54 and the thrust element 52 lie in different, parallel planes. This is to accommodate the spacing or gap indicated at 66 between the end of the bearing 34 and the thrust washer 68. To accommodate this gap 66, the connectors 56a–c extend, in part, transverse to the planes 62, 64 in a partial U-shape, with one leg 70 of the "U" shorter than the other leg 72 to establish the gap 66.

The motor 10 includes a wicking material, such as a felt wick 74, that is positioned, in part, between the bearing 34 and the thrust element 52 of the retainer 50. The felt wick 74 supplements the supply of oil indicated at 0 to the bearing 34 to maintain the oil film between the shaft 16 and the bearing 34 surface. The wicking material 74 also aids in the lubrication between the thrust washer 68 and the thrust surface 52.

The thrust washer 68 is positioned adjacent to and abutting the thrust surface 58. The thrust washer 68 transfers the forces resulting from axial movement of the shaft 16, to the thrust element 52. The thrust washer 68 includes a radial channel 78 that throws or slings oil O, that can otherwise bypass the wicking material 74, back into the oil well 76.

Advantageously, the present dual rate spring retainer 50 provides a number of advantages over known bearing retainer configurations. First, the present retainer 50 provides support to hold the spherical bearing 34 securely in the end shield bearing seat 38. At the same time, the retainer 50 provides a thrust element 52 having a thrust surface 58 that is essentially independent of the main bearing 34. The thrust element 52 absorbs or compensates for any axial forces that may be exerted on or by the motor 10 while at the same time it positions the motor rotor in the nominal center of the stator. Thus, the thrust element 52 provides a resilient surface to absorb any axial pulsations of the rotor, and thereby prevent objectionable motor noises.

Moreover, these dual functions are provided in a single, relatively readily manufactured part. Unlike known configurations which require separate bearing retainer springs and thrust surfaces, the present dual rate retainer spring 50 provides both functions in a single, readily manufactured part, thus reducing the overall number of parts required for manufacture of the motor 10 and the overall cost.

As illustrated, the bearing load springs or projections 60a–c are relatively short projections that are relatively stiff and thus and provide adequate force on the main bearing 34 to hold it in the bearing seat when deflected a small amount. The connectors 56a–c that connect the support element 54 with the inner thrust element 52 are configured to provide a spring constant that absorbs and dissipates the "end bump" forces that may occur during operation. This can be accomplished by providing the connectors 56a–c with lesser or lower spring constants or spring rates than the projections 60a–c.

Wicking material 80 is provided in the space defined by the oil well cover 76, up to and around the retainer 50. Advantageously, the spaces defined between the outer support element 54 and the inner thrust element 52 accommodate wicking material 80 to assure that sufficient oil is provided to the bearing 34.

An alternate embodiment 150 of the dual rate retainer spring is illustrated in FIGS. 4–5. For purposes of this discussion, items identical to those of the embodiment of FIGS. 2–3 will be identified with like numbers. This embodiment of the retainer 150 includes an outer support element 54 and an inner thrust element 52. The embodiment further includes inwardly projecting bearing load springs or projections 60a–c, and connectors 156a–c extending between the outer support 54 and the inner thrust element 52. In this embodiment, the connectors 156a–c extend between the outer support element 54 and the inner thrust element 52 in a serpentine-like manner, essentially defining an S-shape. Like the embodiment 50, the present S-shaped connectors 156a–c, as illustrated in FIG. 5, displace the plane 62 of the thrust element 52 from that of the support element 54 to define the gap 66 between the end of the bearing 34 and the thrust washer 68.

Like the previously discussed embodiment 50, the longer S-shaped connectors 156a–c of the retainer 150 provide weaker spring forces or spring constants than those of the shorter bearing load springs 60a–c. As such, a wide variety of spring loads can be configured, in which the spring loads for the thrust element 52 of the retainer 150 can differ from those of the bearing load springs 60a–c. Thus, while the bearing load force can be relatively high, resulting in an essentially rigid support, the bump or thrust surface is configured to permit considerably more movement thereof relative to the bearing load support. Methods for forming the connectors 56a–c, 156a–c and the bearing load springs 60a–c so that these elements have different spring rates or spring constants will be recognized by those skilled in the art.

From the foregoing, it will observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

We claim:

1. A bearing retainer for use in a dynamoelectric machine, the machine having a rotating shaft and a bearing, the bearing having a passage therethrough for rotatably receiving the shaft and being positioned within a bearing seat, the bearing retainer comprising:

inner and outer concentric support elements, the inner support element defining a thrust portion, each the inner and outer support elements defining a plane;

a plurality of connectors extending between and connecting the inner and outer concentric support elements, the connectors being configured so as to support the inner support element in concentric relation to the outer support element and to support the inner and outer support elements such that the planes defined thereby are non-coplanar with one another; and a plurality of bearing load support projections extending inwardly from the outer concentric support element, the load support projections extending inwardly a predetermined distance so as to define a gap between an end of each projection and the inner support element.

2. The bearing retainer in accordance with claim 1 including three connectors extending between the inner and outer concentric support elements, the connectors being equally circumferentially spaced from one another.

3. The bearing retainer in accordance with claim 2 including three bearing load support projections equally circumferentially spaced from one another and equally circumferentially spaced from their respective adjacent connectors.

4. The bearing retainer in accordance with claim 1 wherein the connectors extend radially, in a straight line between the inner and outer concentric elements.

5. The bearing retainer in accordance with claim 4 wherein the connectors extend, in part, in a longitudinal direction, transverse to the plane defined by the outer concentric element.

6. The bearing retainer in accordance with claim 1 wherein the connectors extend radially in an S-shape.

7. The bearing retainer in accordance with claim 6 including three bearing load support projections equally circumferentially spaced from one another and equally circumferentially spaced from their respective adjacent connectors.

8. The bearing retainer in accordance with claim 6 wherein the connectors extend, in part, in a longitudinal direction, transverse to the plane defined by the outer concentric element.

9. A bearing retainer for use in a dynamoelectric machine, the machine having a rotating shaft and a bearing, the bearing having a passage therethrough for rotatably receiving the shaft and being positioned within a bearing seat, the bearing retainer comprising:

inner and outer concentric support elements, the inner support element defining a thrust portion, each the inner and outer support elements defining a plane;

means for resiliently connecting the inner and outer concentric support elements configured so as to support the inner support element in concentric relation to the outer support element and to support the inner and outer support elements such that the planes defined thereby are non-coplanar with one another; and a plurality of bearing load support projections extending inwardly from the outer concentric support element, the load support projections extending inwardly a predetermined distance so as to define a gap between an end of each projection and the inner support element.

10. The bearing retainer in accordance with claim 9 wherein the connecting means is interposed between the bearing load support projections.

11. The bearing retainer in accordance with claim 9 including three bearing load support projections equally circumferentially spaced from one another.

* * * * *